April 6, 1954      F. SOCHOR      2,674,166

MINIATURE CAMERA

Filed May 31, 1950

FRANZ SOCHOR
INVENTOR.

BY

Patented Apr. 6, 1954

2,674,166

UNITED STATES PATENT OFFICE 2,674,166

MINIATURE CAMERA

Franz Sochor, Vienna, Austria, assignor to
Otto Brullhard, Forest Hills, N. Y.

Application May 31, 1950, Serial No. 165,161

3 Claims. (Cl. 95—34)

This invention relates to miniature cameras using, for example, sixteen millimeter films. The object of the invention is to provide a small compact camera having a film operating mechanism in the form of a complete self contained unit adapted to be moved into and out of the camera when a picture is to be taken and an unexposed film portion placed in position for the taking of the next picture.

One object is to provide a film unit as a separate movable and detachable part of the camera, the unit containing film supporting and film operating means so arranged that when the unit is moved into the camera to operating position an unexposed film portion is automatically alined with the lens and the exposure opening of the camera so that a picture can be taken. Another object is to provide the unit with means whereby, when the unit is moved partially out of the camera and out of alinement with the lens and exposure opening, the film is automatically shifted and wound up so that an unexposed film portion may be moved into photographing position on the next inward move of the unit.

Another object of the invention is to provide a camera with a movable film unit which by a quick in-and-out movement automatically operates the film, shutter devices and associated parts whereby a series of pictures may be taken without requiring much thought or movement on the part of the user. Still another object is to arrange the camera and the film unit so that the latter may be completely detached from the camera and another loaded film unit inserted and used. Other objects and features of the invention will be pointed out hereinafter. The invention is illustrated in the accompanying drawing in which Fig. 1 is a vertical sectional view of the camera with the parts in position ready to take a picture.

Figure 1:
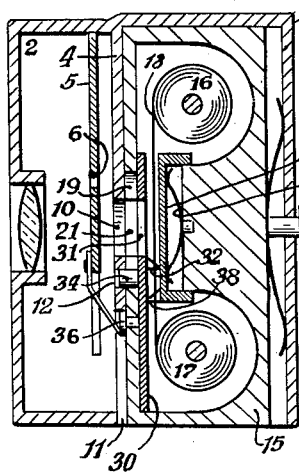

The entire camera mechanism is contained within a housing 1 which is divided into a shutter chamber 2 and a film chamber 3 by a dividing wall 4. The shutter chamber 2 contains a shutter 5 with an exposure opening 6 and the shutter slides vertically in side guides 7. The camera has a suitable lens mechanism identified by the lens 8. The shutter carries a spring 9 at the bottom. The dividing wall 4 has an exposure opening 10, a hole 12 and a slot 11 as shown. The exposure opening is normally closed by the shutter.

The film chamber 3 is arranged to receive a film unit to be moved into and out of the chamber or entirely withdrawn from the camera. The film unit comprises a casing 15 with two chambers in which are placed or which will contain the film spools 16 and 17. The film 18 runs through a film passage from the unexposed spool 16 to the exposed spool 17. The casing 15 has in front a picture window 21 with upper and lower slots 19 and 20, respectively, see Fig. 5. The film is yieldingly held in picture taking position and while it passes from one spool to another spool by a spring pressed platen 22 under pressure by a spring 23. The platen forms one side of the film passage. In front of the film there is a film holder plate 30 having a window 31. The plate forms the other side of the film passage. The film holder plate carries an upper film hook 32 below the window 31. The hook engages the usual perforations in the film to hold the exposed film steady while unexposed film is being unreeled from the film spool 16 and fed into exposure position.

The film holder plate 30 also carries a button 34 adapted to enter the aforesaid hole 12 in the wall 4. The holder plate is supported in guides 35 in the casing 15 so that the casing may move easily with respect to the holder plate, the latter being held immovable by the button 34 engaging with the hole 12 in the partition wall 4. The casing 15 carries a second button 36 to operate the shutter 5. The platen 22 carries a lower film hook 38. The entire film unit is held against the wall 4 by a spring 40 carried by an axially movable button 41.

It should be noted for a better understanding of the invention that the film holder plate 30 is always stationary with respect to the camera. This will be observed from the two different views in Figs. 1 and 2. The film unit casing with the parts carried thereby is movable both with relation to the camera and with relation to the film holder plate. The entire film unit is detachably supported in the camera.

The operation is as follows: Normally the parts are in the positions as shown in Fig. 1, the camera being ready for taking a picture. It will be seen that the three openings, 10 (in wall 4), 21 (in unit casing 15) and 31 (in film holder plate 30) are in alinement in front of the unexposed film 18 and that the shutter 5 is closed. By any well known means in the camera art, not shown, the shutter is operated to move the shutter opening 6 across the picture or exposure openings to expose the film and the picture is taken. Note that the film holder plate 30 cannot move because its button 34 is seated in the hole 12 in wall 4. At this time the button 34 is within the lower slot 20 of the window 21.

Figure 2:
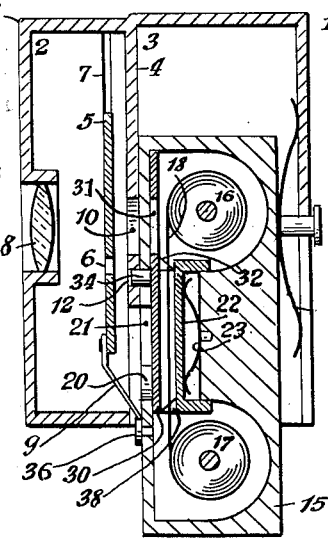
Fig. 2 is a similar view showing the film unit partially moved out of the camera after a picture has been taken.
Figure 3:
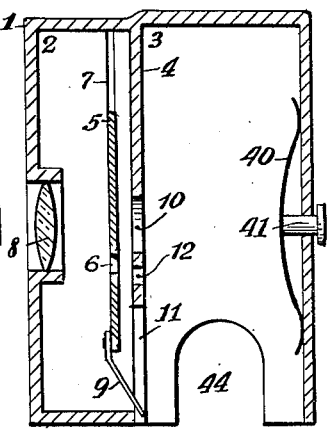
Fig. 3 shows the camera alone after the film unit has been completely removed.
Figure 6:
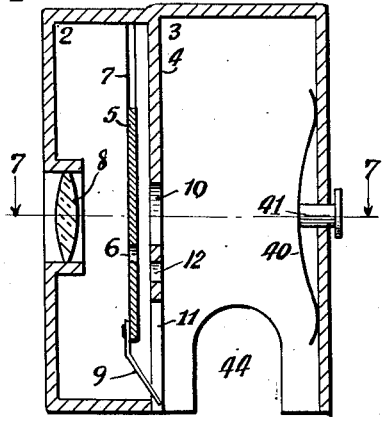
Fig. 6 is a view similar to Fig. 3 but shows the camera casing in horizontal alinement with the units in Figs. 4 and 5.
Figures 4, 5:
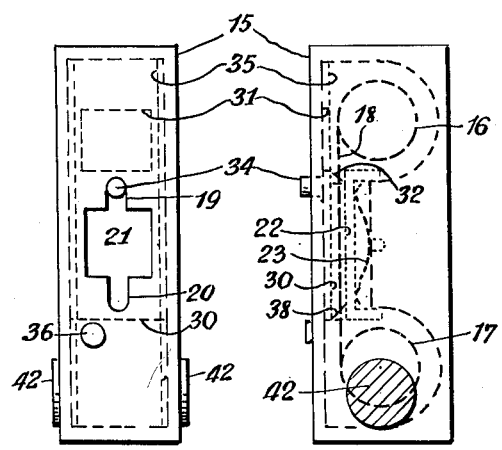
Fig. 4 is an outside view of the removed film unit.
Fig. 5 is an outside view of the film unit looking from the left in Fig. 4.
Figure 7:
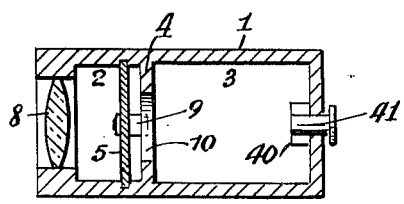
Fig. 7 is a sectional view on the line 7—7 of Fig. 6.

After the picture is taken and in order to make ready for the next picture, the user pulls the film unit partially out of the film chamber as shown in Fig. 2, the film holder 30 remaining stationary. The film casing moves down until the upper slot 19 in the window 21 strikes the button 34 as shown in Fig. 5. In other words, the in-and-out movement of the film unit is limited inwardly when the lower slot 20 hits the button 34 and is limited outwardly when the upper slot 19 hits the button 34. As the casing 15 moves down, the film slides past the upper film hook 32, the platen giving way against the spring 23. The picture window 21 is closed by being moved down in front of the film holder plate 30 and the casing 15 has closed the picture window 10 in the wall 4 and has also closed the picture window 31 in the holder 30. That is, the film is completely protected against exposure to light. The spring 9 on the shutter has snapped inwardly and now rests upon the button 36, Fig. 2.

The user now pushes the film unit back into the camera. During this return movement the lower film hook 38 which is carried by the yielding platen 23 which moves inward with the unit slides over the perforations in the film while the stationary upper film hook 32 now prevents upward movement of the film, the result being that as the casing 15 moves inwardly the upper spool 16 feeds out film for the next picture exposure. As the casing moves into the camera, the button 36 lifts the shutter up and back into initial shutter position. At the end of this movement, the shutter spring 9 hits the edge of the slot 11 and is thereby released from engagement with the button 36. The shutter is held in its upper and lower positions by any suitable friction means, not shown. The shutter opening 6 is of course so positioned that upon the inward movement of the film unit 15 the opening 6 passes beyond the exposure opening 10 before the unit exposure opening 21 is brought into register therewith.

The film unit is conveniently moved into and out of the camera by the user taking hold of knurled grips 42 accessible through openings 44 in the casing 1. The film unit may be entirely detached by pulling outward on the button 41 to flatten the spring 40 so that the unit may be moved away from the wall 4 to detach the button 34 from the hole 12 and then completely removing the unit. On the return movement the button 34 will automatically find its way into the hole 12 under the action of the spring 40.

Many details are not shown in the drawing, nor described. For example, it will be understood that one side of the film unit is removable so that film can be inserted and a known form of adjustable focusable lens mechanism will be used. These and other details are not deemed necessary for an understanding of the invention, such details being known to the art.

The important feature of the invention resides in the fact that the film may be changed between the taking of pictures by a quick in-and-out movement of a complete film unit, and that more than one unit may be provided for a single camera to insure ample film supply. There is no winding or unwinding of film or other manual operations required. Not only is the film operated by the movement of the film but all openings are likewise closed to protect the film and the shutter is placed in its two extreme positions.

I claim:

1. A roll film camera comprising a casing with a partition therein forming a shutter chamber and a film chamber, the latter having an entrance opening at the bottom, a camera exposure opening in said partition between said chambers, a lens and a shutter in said shutter chamber, said shutter having an exposure opening movable across said camera exposure opening for exposure of film therethrough, a film containing unit in said film chamber and provided with an exposure opening, said unit being movable inward in the film chamber through said entrance opening to place the unit exposure opening in alinement with said camera exposure opening and to place unexposed film for exposure through the said two openings and movable outwardly in the film chamber to close said exposure openings and remove exposed film from exposure position, said unit comprising a casing, a film holding plate therein provided with a film window, a button in said plate automatically engaging a hole in said camera partition when said unit is first inserted into said film chamber to lock said plate to the camera with said film window in registry with the camera exposure opening and to maintain said unit in photographic operative sliding relation with the camera, film spool chambers in said unit casing connected by a film passage, spools in said spool chambers for shiftably supporting the film to move through said film passage, said plate forming one side of said passage, a film engaging platen in said unit movable therewith and forming the opposite side of said passage, an upper film hook on said plate extending into the passage engaging the film therein for supporting unexposed film for exposure and prevent return movement of exposed film when said unit is moved inwardly, a lower film hook on said platen extending into the passage engaging the film therein to remove exposed film from exposure position when said unit is moved outwardly in the film chamber, said unit casing having upper and lower slots extending from the unit exposure opening to alternately engage the aforesaid plate button to limit the outward and inward movement, respectively, of said unit within the film chamber, cooperating means on said shutter and on said film unit for moving the shutter back into initial position when said unit is moved inwardly in the film chamber and a compression spring in the latter for maintaining said unit in photographic operative relation with the camera.

2. A camera and film unit according to claim 1 including a button on said compression spring accessible from outside the camera for disengaging said spring from said unit for complete removal of the unit from the camera.

3. A camera and film unit according to claim 1 in which said film unit is completely detachable from the camera and insertable as a film unit into the camera.

References Cited in the file of this patent

UNITED STATES PATENTS

| Number | Name | Date |
|---|---|---|
| 2,143,769 | Fairbanks | Jan. 10, 1939 |
| 2,169,548 | Zapp | Aug. 15, 1939 |
| 2,395,828 | Kallusch | Mar. 5, 1946 |

FOREIGN PATENTS

| Number | Country | Date |
|---|---|---|
| 479,135 | Great Britain | Feb. 1, 1938 |